UNITED STATES PATENT OFFICE.

WILLIAM HARROLD SMITH, OF CHICAGO, ILLINOIS.

FUEL.

SPECIFICATION forming part of Letters Patent No. 233,887, dated November 2, 1880.

Application filed August 2, 1880. (No model.)

*To all whom it may concern:*

Be it known that I, WILLIAM HARROLD SMITH, of Chicago, in the county of Cook and State of Illinois, have invented certain new and useful Improvements in Fuel; and I do hereby declare that the following is a full, clear, and exact description of my invention, which will enable others skilled in the art to which it appertains to make and use the same.
This invention relates to an improved fuel made from sawdust or other fragmentary waste products of saw-mills.

I prepare my improved fuel as follows: I take common sawdust or other like fragmentary wood-waste, such as fine short chips or shavings from planing-mills. I heat this material in any suitable heater thoroughly in all parts to 150° Fahrenheit, or more, being careful not to burn it. Then I place the heated material in a strong mold and forcibly compress it. I use for the compression the blows of a powerful steam-hammer.

The material when compressed assumes a bulk greatly lessened, and is of a density about equal to bituminous coal, more or less. It may be removed now from the mold, and will cohere and retain its new form and condition, and may be used thus for fuel, giving a strong heat, and burning much as charcoal burns, only with a hotter flame. However, if the fuel blocks thus prepared are to be exposed to the wet, I prefer to coat them with some inflammable waterproofing mixture, such as coal-tar pitch, which also increases their combustibility.
This fuel is very cheap, as I am enabled in its manufacture to use the sawdust which otherwise mostly goes to waste, and the present supply of which is almost inexhaustible.

I do not here claim the process, as I have made that the subject of a separate application for a patent.

What I claim, and desire to secure by Letters Patent, is—

The fuel consisting of common sawdust condensed and solidified into self-sustaining blocks without cohesive admixture, substantially as specified.

WILLIAM HARROLD SMITH.

Witnesses:
H. M. MUNDAY,
EDMUND ADCOCK.